G. CLARK.
APPARATUS FOR REFINING AND AGING ALCOHOLIC LIQUORS.
No. 192,635. Patented July 3, 1877.
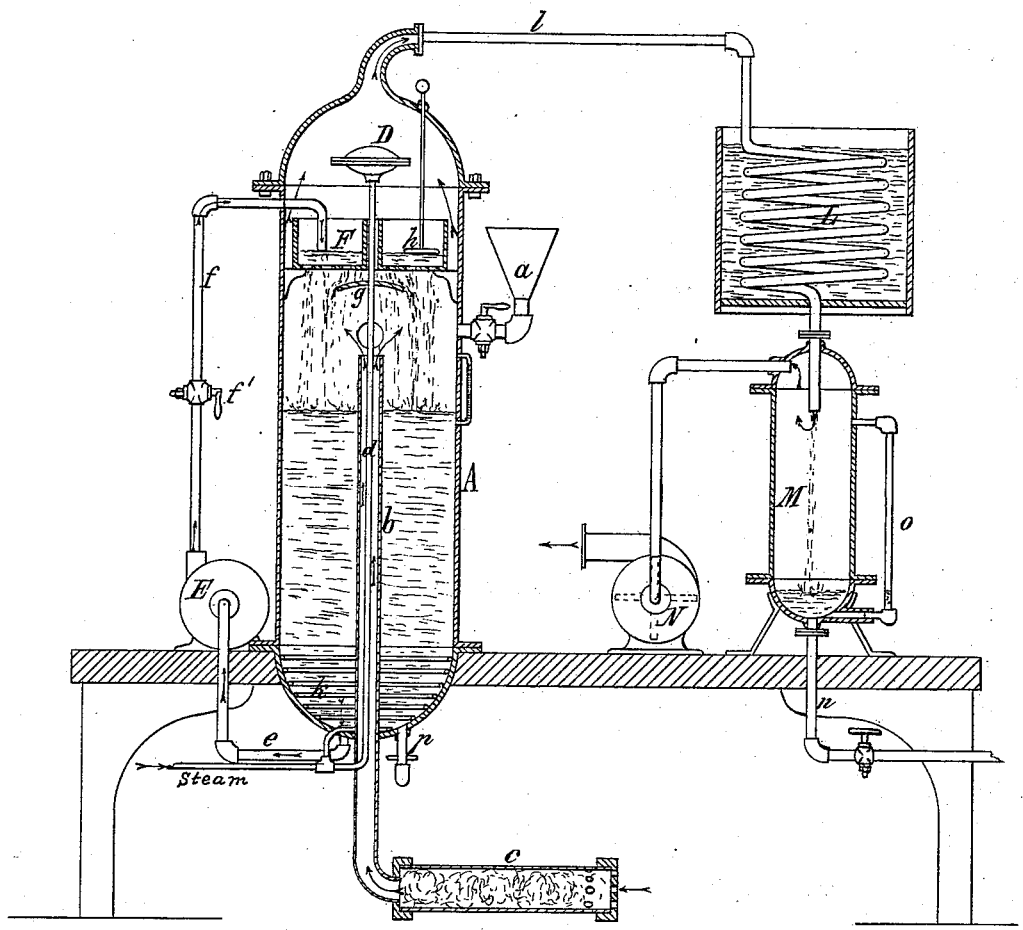

UNITED STATES PATENT OFFICE.

GEORGE CLARK, OF BUFFALO, N. Y., ASSIGNOR OF A PART OF HIS RIGHT TO FREDERICK H. GATCHELL, JAMES M. MERRITT, AND MILTON BROWN, OF SAME PLACE, AND NATHAN B. GATCHELL, OF LANCASTER, N. Y.

IMPROVEMENT IN APPARATUS FOR REFINING AND AGING ALCOHOLIC LIQUORS.

Specification forming part of Letters Patent No. 192,635, dated July 3, 1877; application filed May 7, 1877.

*To all whom it may concern:*

Be it known that I, GEORGE CLARK, of the city of Buffalo, in the county of Erie and State of New York, have invented certain new and useful Improvements in Apparatus for Refining and Aging Alcoholic Spirits, which improvements are fully set forth in the following specification, reference being had to the accompanying drawing.

My invention relates to an apparatus for refining and aging raw alcoholic spirits by heating the spirits to a proper temperature, and at the same time subjecting the same in a spray to the action of an air-current, whereby the crude and more volatile components of the spirits are separated and removed therefrom. The air-current, charged with the more volatile components of the spirits, is subsequently passed through a worm or other suitable condenser, whereby these components are condensed and collected in any suitable manner.

My invention consists of the particular construction of the apparatus, and its nature will be fully understood from the following description:

In the accompanying drawing, representing a sectional elevation of my improved apparatus, A represents the distilling vessel or tank, made of any suitable form and size, and provided with a feed-funnel, $a$, for introducing the spirits to be treated into the tank. $b$ is the air-pipe admitting the air into the tank A above the surface of the liquor contained therein. As shown in the drawing, the pipe $b$ is arranged vertically in the tank A, entering at the bottom thereof, and terminating at a suitable height above the liquid-level. The outer end of the air-pipe $b$ is provided with an enlarged chamber, $c$, filled with cotton for intercepting any dust and other impurities which may be contained in the air entering the pipe $b$. $d$ is a steam-pipe arranged within the air-pipe $b$ for heating the air before it comes in contact with the spirits. The pipe $d$ extends into the upper portion of the tank A, where it connects with a steam-chamber, D, which latter heats that portion of the tank, and prevents any premature condensation of the volatile components separated from the spirits. E represents the circulating-pump, having its suction-pipe $e$ connected with the bottom of the tank A, and its discharge-pipe $f$ opening into the upper portion of the tank, so that by actuating the pump E the liquor is caused to circulate through the tank in a downward direction. F is a receiver, constructed with a perforated bottom, and arranged in the upper portion of the tank A below the discharge-pipe $f$ of the circulating-pump, so as to receive the liquor discharged by the latter and break it up into a spray or a great number of fine streams. $g$ represents a shield or deflector arranged under the perforated bottom of the receiver F to prevent the liquor escaping therefrom from flowing into the air pipe $b$. The receiver F is made of less width than the tank, so as to leave an air space or passage all around the receiver. The discharge-pipe $f$ of the pump E is provided with a cock, $f'$, for regulating the quantity of liquor discharged by the pump, and the receiver F is preferably furnished with a float, $h$, indicating the height of the liquid-level therein. $k$ represents a coil of steam-pipes, arranged in the lower portion of the tank A, for heating the liquor. $l$ is the air-discharge pipe, connecting with the upper end of the tank A, and leading to a worm, L, or other suitable condenser. M is a receiver, arranged underneath the worm L, the tail end of which enters the receiver M at the top, so as to conduct the spirits condensed in the worm into the receiver M. N is a suction-fan or other equivalent device connected with the receiver M for drawing a current of air through the apparatus. $n$ represents the discharge-pipe of the receiver M, and $o$ a glass indicator-tube attached to the latter for showing the height of the liquor therein.

Motion being imparted to the fan N, an air-current is induced through the apparatus, which enters through the pipe $b$, and escapes from the discharge-spout of the fan. Upon applying power to the pump E the raw spirits placed in the tank A, and heated to a proper temperature by the steam-coil $k$, are elevated, and descend in numerous fine streams through the current of heated air entering the tank A from the upper end of the pipe $b$. The crude and more volatile components of the spirits are separated from the alcohol by the combined action of the heat and air-current, and are removed by the air-current until they reach the worm L, where the various volatile components or ingredients are condensed, the least volatile first, and the more volatile components nearer the tail end of the worm. The latter may be provided with a suitable number of draw-off cocks for drawing each of the components separately. The liquid not otherwise drawn from the worm is collected in the receiver M. After the liquor in the tank A has been freed from its more volatile ingredients, as above described, it is drawn off through a pipe, $p$, and a new charge placed in the tank and treated in the same manner.

Having thus fully described my invention, what I claim as new, and desire to secure by Letters Patent, is—

1. The combination and arrangement, with the tank A, of the air-pipe $b$, circulating-pump E, perforated receiver F, condenser L, receiver M, and exhaust device N, substantially as and for the purpose hereinbefore set forth.

2. The combination, with the tank A and exhaust device N, of the air-pipe $b$, arranged vertically within the tank A, and terminating above the liquid-level therein, steam-pipe $d$, and perforated receiver F, arranged above the upper end of the air-pipe $d$, substantially as and for the purpose hereinbefore set forth.

3. The combination, with the tank or still A, of the air-pipe $b$, steam-pipe $d$, provided with steam-chamber D, circulating-pump E, and perforated receiver F, substantially as and for the purpose hereinbefore set forth.

GEORGE CLARK.

Witnesses:
GEORGE H. SYKES,
CHAS. J. BUCHHEIT.